Nov. 6, 1928.
J. R. SNYDER
SHOCK ABSORBER
Filed Aug. 9, 1924
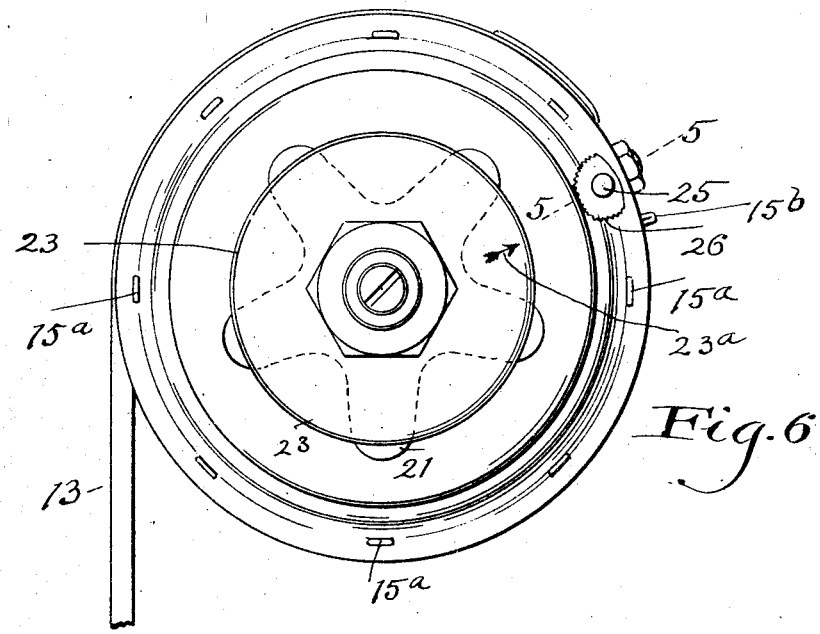
Fig. 6.
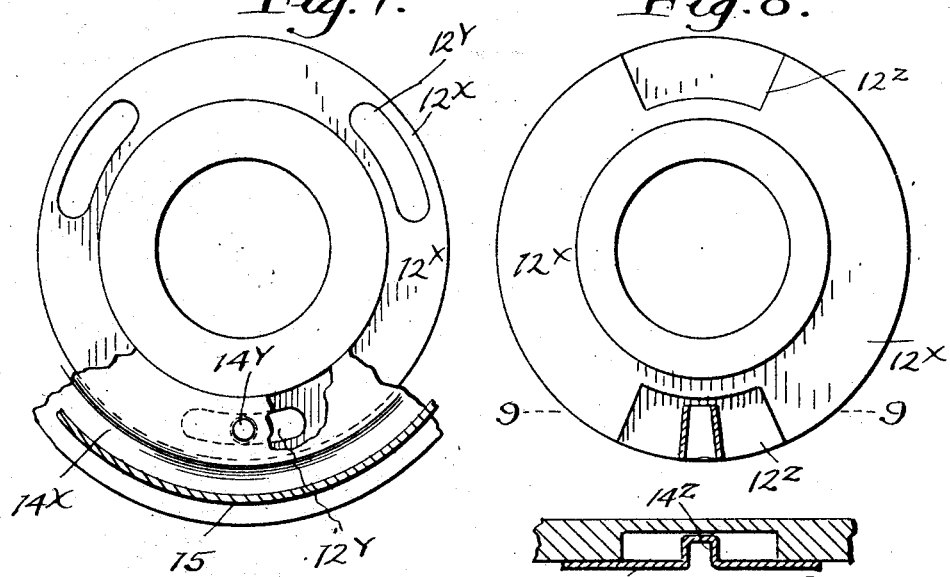
Fig. 7.   Fig. 8.
Fig. 9.
Inventor
Jacob R. Snyder Patented Nov. 6, 1928.

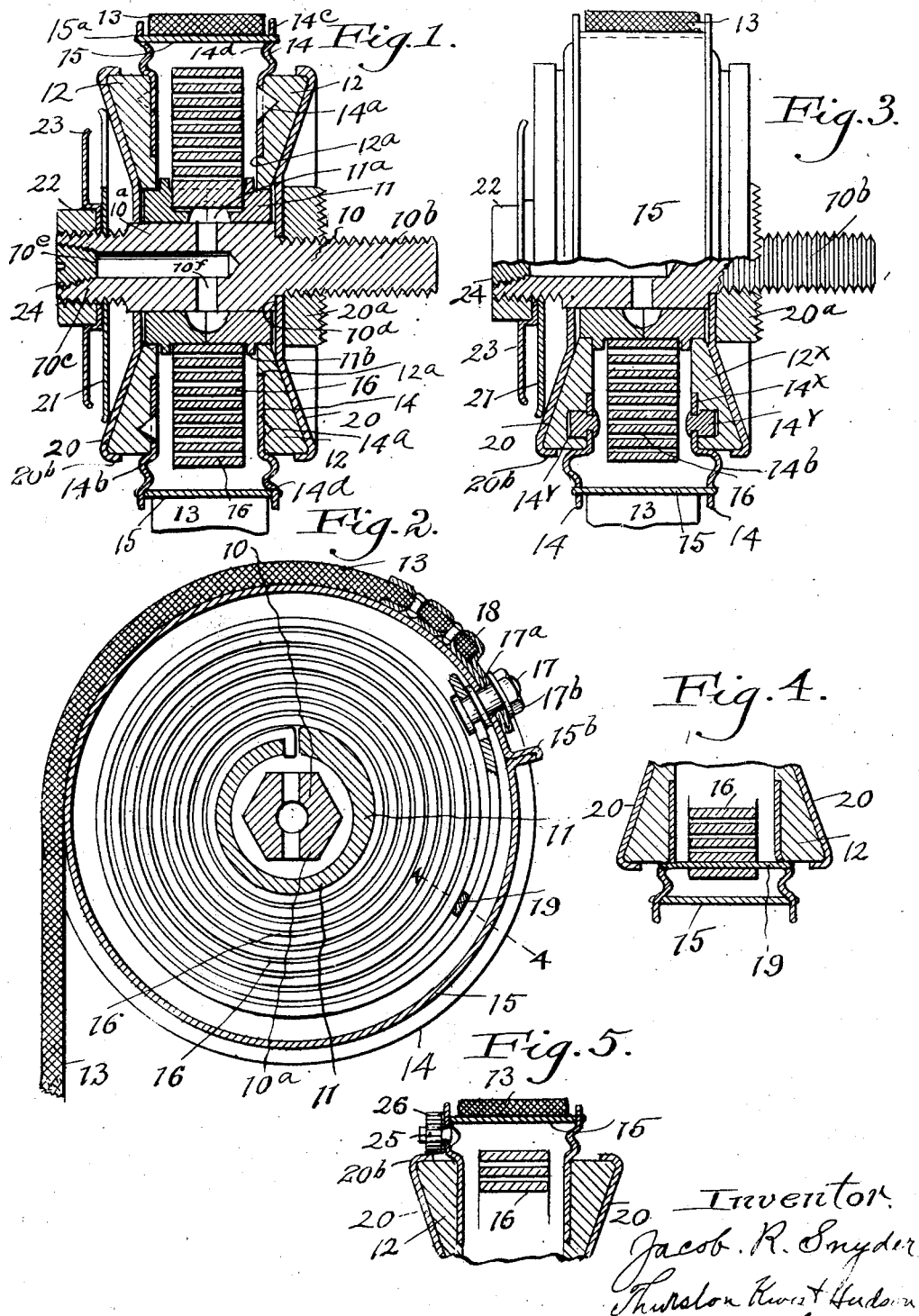

1,690,256

UNITED STATES PATENT OFFICE.

JACOB R. SNYDER, OF CLEVELAND, OHIO, ASSIGNOR TO THE STAR REBOUND CONTROLLER COMPANY, OF CLEVELAND, OHIO, A CORPORATION OF OHIO.

SHOCK ABSORBER.

Application filed August 9, 1924. Serial No. 731 014.

This invention relates to shock absorbers adapted especially for use on motor vehicles, and has for its chief object the provision of a shock absorber of the friction retarded type which combines the features of cheapness in construction and efficiency in action. More particularly it is the object to provide a shock absorber of the type having a frictionally retarded drum adapted to accommodate a belt or strap designed to be wound onto and unwound therefrom, but which does not require a casing to enclose the drum and other parts such as the spring which is associated with the drum, the inner portion of the belt, and the members which frictionally oppose the movement of the drum.

More specific objects are to provide means whereby the parts requiring lubrication can be supplied with lubricant without liability of the lubricant being lost, also to exclude dirt and other foreign matter from between the relatively moving surfaces such as the friction members and the portions of the drum which these members engage, and additionally to provide a construction which is not only inexpensive, but wherein the parts can be readily assembled and disassembled.

The invention may be briefly summarized as consisting in certain novel details of construction, and combinations and arrangements of parts which will be described in the specification and set forth in the appended claims.

In the accompanying sheets of drawings wherein I have shown the preferred construction and a modification as to one feature thereof, Fig. 1 is a vertical sectional view through the shock absorber; Fig. 2 is a sectional view at right angles to the section in Fig. 1; Fig. 3 is a view partly in elevation and partly in section illustrating a modified arrangement and manner of connecting certain metallic and non-metallic portions of the drum; Fig. 4 is a detail sectional view along the line 4 of Fig. 2; Fig. 5 is a detail sectional view along the line 5—5 of Fig. 6; Fig. 6 is a side elevation of the shock absorber shown in Fig. 1; Fig. 7 is an inner face view of a portion of the drum of Fig. 3 illustrating a manner in which the wooden members may be connected to the outer metallic portion of the drum so as to permit a neutral zone or a slight relative movement between these parts for a purpose to be explained; Fig. 8 is a similar view showing a modification of this feature; and Fig. 9 is a sectional view substantially along the line 9—9 of Fig. 8.

The shock absorber includes a stationary center bolt 10, having a non-circular enlarged middle portion $10^a$, preferably hexagonal in cross-section and provided at one end with a relatively long threaded portion $10^b$ by which the center bolt may be attached to a suitable fitting to connect it to the chassis frame of the vehicle, assuming that the shock absorber is employed for motor vehicle use. At the other side of the middle portion $10^a$ is a relatively short threaded end $10^c$.

Surrounding the relatively large middle portion $10^a$ of the center bolt is a stationary collar 11, preferably formed in two halves, this collar serving as a support for a spring as well as a bearing member for the drum.

It might be here stated that the shock absorber to which the features of my invention are applied most advantageously is of the type which comprises a drum rotatable about the center bolt in opposite directions, a belt which is wound part way around the drum, and has one end connected thereto while the other end is connected to the axle of the vehicle, or other suitable part in the event the shock absorber is not employed for motor vehicle use. When the body and axle approach each other, or during the compression movement of the main springs, the belt is wound onto the drum by a spring connected to the drum, and during the opposite or rebound movement the belt is unwound from the drum, causing the spring to be wound up or tightened. The spring referred to, therefore retards the rebound movement, but additionally the movement of the drum in both directions is opposed frictionally by one or more members which engage the drum under certain pressure which permits movement of the drum in either direction, but under a predetermined frictional resistance.

In the present construction the drum is hollow and encloses the shock absorber spring, and additionally it is preferably a composite drum, being composed in part of non-metallic self-lubricating members, and one or more metallic members. In the present instance, the drum is composed of two non-metallic side members 12, preferably of oil impregnated wood, and an outer metallic portion which joins the members 12 and receives the belt 13.

The metallic portion of the drum may be composed of a single unit or part, or of two or more parts. In the construction which is preferred, for the reason that I find it to be the least expensive, the metallic portion of the drum is composed of two spaced sheet metal disks 14 which are secured to or carried by the non-metallic or wooden disks 12 and a ring or annulus 15 which unites the two members 14 and on which the belt 13 is wound during the compression stroke of the main springs and from which it is unwound during the rebound stroke.

As herein illustrated, the metal disks 14 engage the inner sides of the wooden disks 12, and in the preferred construction which I have illustrated in Fig. 1, they are secured to the inner sides of the disks 12. They can be secured in place in various ways, but an inexpensive way is to provide spurs $14^a$ on the disks 14 which can in the process of assembling be pressed into the wooden disks 12. Preferably the inner edges or peripheries of the disks 14 engage shoulders $12^a$ on the inner sides of the disks 12, and just outside of the disks 12 the disks 14 are curved laterally outward to provide shoulders $14^b$ which engage on the peripheral portions of the disks 12 and assist in transmitting to the latter the load created by the pull on the strap or belt 13.

The disks 14 and the band or annulus 15 can be fastened together in various ways, but preferably by providing on the edges of the band 15 lugs $15^a$ designed to project through suitably located openings near the outer edges of the disks 14, and by slightly riveting or upsetting the ends of the lugs. It might be here stated, however, that in view of the manner in which the friction disks, hereinafter referred to, engage the wooden disks 12, the upsetting of the ends of lugs $15^a$ is not necessary to retain the parts of the drum in proper assembled relationship.

Preferably the band 15 is supported on the disks 14, a slight distance inwardly from the outer edges of the disks 14, so as to leave beyond the band 15 outwardly extending flanges $14^c$ which serve as guides for the belt or strap 13, as clearly illustrated in Figs. 1 and 3. Additionally, I prefer that the disks 14 be given the equivalent of a compound curve between the wooden disk 12 and the band 15, so as to provide annular shoulders $14^d$ constituting seats for the band 15, this latter feature being desirable to minimize the liability of leakage of lubricant from the interior of the drum.

The annular disks 14 are punched from sheet metal and in one operation they can be blanked out, curved to provide the shoulders $14^b$ and $14^d$ and the openings punched which receive the lugs $15^a$ of the band 15. The band 15 is formed from a strap of sheet metal of suitable length which is formed into annular shape and its ends fastened together in any suitable way as by welding. I prefer to bend the ends of the straps laterally outward and weld the ends together, face to face, as illustrated at $15^b$ in Fig. 2, forming an outward extension or protuberance for a purpose to be explained.

The spring which is located in the drum and rotates the drum in one direction to wind the strap thereon, as previously explained, is shown at 16, this spring being preferably formed of flat stock into spiral or clock type form. The inner end of this spring is fastened to the collar 11, preferably by extending its inner end into an opening thereof as illustrated in Fig. 2. The outer end of the spring is attached to the band 15 of the drum as is also the inner end of the strap 13. Preferably the outer end of the spring and the inner end of the strap are secured to the band 15 by a single bolt 17 or equivalent device which passes radially through an opening of the band as clearly illustrated in Fig. 2. With this construction the end of the spring is hooked over the inner end of the bolt and lies between two shoulders $17^a$ located on the inner side of the band, the outermost shoulder engaging the latter and the portion of the bolt projecting outwardly through the band passes through the end of a metal clip 18 riveted or otherwise secured to the end of the strap 13, the parts being held in this relationship by a nut $17^b$ screwed on the bolt 17.

The bolt 17 passes through the band close to the protuberances $15^b$ formed by the ends of the strap of which the band 15 is formed, the protuberance being located on the opposite side of the bolt from that in which the strap 13 extends from the bolt. This protuberance therefore prevents the strap being applied in the wrong direction to the drum, and makes it impossible for the parts to be assembled improperly by an inexperienced person.

The last or outer convolution of the spring is preferably supported and held from sagging or bending inwardly as when the spring is tightly wound up, and this is preferably accomplished by providing between the disks 14 a cross-piece 19 (see Figs. 2 and 4) over which cross-piece the last convolution of the spring extends as illustrated in Fig. 2. This prevents the bending of the spring adjacent the bolt 17 and thereby increases its life and keeps the body of the spring substantially concentric with the center bolt when the spring is fully wound up.

The rotation of the drum in both directions is retarded by two stationary friction disks 20 which engage the outer sides of the wooden disks 12. One of these friction disks 20 is solidly clamped against a shoulder $10^d$ of the center bolt by a nut $20^a$ which is screwed onto the threaded end $10^b$ of the center bolt, while the other friction disk 20 fits onto the hexagonal middle portion 10ª of the center bolt and is pressed yieldingly inward under adjustable spring pressure, so as to provide the desired pressure between the two friction disks and the disks 12 of the drum which they engage. Different kinds of springs may be employed for this purpose but in this instance I show a spring 21 punched from sheet metal and suitably tempered, this spring being preferably of the star type with spaced arms engaging the adjacent friction disk 20, as illustrated. This star spring 21, which fits over the relatively short threaded end 10ᶜ of the center bolt, is caused to bear with the desired pressure against the adjacent disk 20 by means of a nut 22 which is screwed onto the end 10ᶜ of the center bolt. A sheet metal disk 23 covers the star spring or the major portion of it, this disk also surrounding the end of the center bolt and being preferably cupped to receive the nut 22 so that when the nut is turned to adjust the pressure of spring 21 the disk 23 will turn with it. The disk 23 may be provided with a suitable indicating mark as shown at 23ª in Fig. 6, which by its position with reference to the fingers or arms of the star spring serves as an indication of the tension which is imposed in the star spring.

The wooden disks 12 of the drum have their outer surfaces tapered inwardly and the friction disks 20 conform to this taper so that the friction disks serve to support the drum as well as to frictionally resist its movement. The inner portions of the disks 12 where they fit onto the collar 11 are relatively narrow and while the inner portions have a bearing on the collar 11, the principal bearing is provided by the friction disks so that wear on the inner portions of the disks 12 where they engage the collar will not disturb the concentric relationship between the drum and the center bolt.

It might be noted that the friction disks extend along the outer tapered faces of the wooden disks 12 and extend inwardly a suitable distance over the peripheral portions of the disks 12 as indicated at 20ᵇ. This effectively prevents dirt and other foreign material entering between the friction disks and the disks 12 of the drum.

It is desirable that lubricant be supplied to the interior of the drum to lubricate the convolutions of the spring so as to render it noiseless. This can be supplied by a suitable grease gun or in any other way into an opening 10ᵉ of the center bolt, which opening is normally closed by a plug 24. This opening near its inner end communicates with a transverse opening 10ᶠ communicating with an annular groove 11ª of the collar 11, the latter opening in turn communicating with the interior of the drum through the opening in the collar in which the inner end of the spring 16 extends. As already stated, the band 15 is seated against shoulders 14ᵈ of the disks 14 and this in practice makes an oil tight seal, preventing leakage of the lubricant.

In assembling the parts of this shock absorber the right hand friction disk 20 (as the parts are viewed in Fig. 1) is first slipped onto the threaded nut 10ᵇ of the center bolt and fastened in place by the nut 20ª, then the right hand disk 12 of the drum, right hand piece 11 of the collar and the right hand metal disk 14 are applied; then the spring 16 is applied, after which the other parts are applied in order. Then by placing the parts thus loosely assembled into a press the spurs 14ª of the metal disks 14 are caused to be embedded into the wooden disk 12 and at the same time, or subsequently, the ends of the lugs 15ª are upset to make a permanently tight construction of the drum; then when the star spring 21 is placed under suitable tension and the strap 13 is applied, the device is ready for use. It might be here stated that the collar 11 has peripheral flanges 11ᵇ which prevent the inner portions of the wooden disk 12 at any time engaging the spring 16.

Shock absorbers of the type described are generally shipped from the factory in condition to be applied to the cars, and in that event the springs 16 are wound up to the extent required for application to a car. This makes it necessary that some suitable means be provided to hold the drum against rotation relative to the friction disks until the shock absorber is applied to the car. This has been readily accomplished heretofore, when the shock absorber included as a part of the construction a stationary casing enclosing the drum, by simply pulling out the strap to the required extent on a suitable machine and by extending a nail or equivalent device through the strap on the outside of the casing so as to prevent the strap being pulled back in. However, this expedient cannot be utilized with my present shock absorber since it does not include a stationary casing as commonly employed heretofore.

To hold the drum from rotation under the action of the spring 16 when it is wound up until the shock absorber is ready for use, I find it necessary to lock the drum to one of the stationary friction disks 20, and this is accomplished in a very simple manner by providing on one side of the drum a stud or rivet 25 and by mounting on the shank of the rivet a cam shaped holding member 26 with a toothed periphery, the teeth of this member biting into the peripheral part 20ᵇ of the adjacent friction disk (as illustrated in Fig. 5) and thus holding the drum against rotation until after the shock absorber is attached to a car, whereupon the locking member 26 is removed and is no longer needed.

With the construction described above, the parts 12, 14 and 15 of the drum are rigidly fastened together and therefore every movement in either direction imparted to the peripheral part of the drum by the strap 13 or spring 16, is frictionally retarded by the friction disks 20; therefore, minor vibrations or relative movement between the axle and car body are retarded as well as the more extensive relative movements. It may be desirable, however, that the minor vibrations or relative movements between the car body and running gear be unretarded or uninfluenced by the shock absorber as when the car is traveling over a fairly smooth road. In the modifications illustrated, Figs. 3, 7, 8 and 9 show a construction wherein what I term the minor vibrations are not frictionally retarded. This is accomplished by so constructing the drum that a predetermined free relative movement is permitted between the inner portions of the drum which the friction members engage and the outer or metallic portion of the drum to which spring 16 and strap 13 are attached. In accomplishing this result the spurs $14^a$ or whatever equivalent devices may be employed to rigidly fasten the disks 12 to disks 14 are eliminated, but the metal disks, here designated $14^x$, engage the inner sides and the peripheral portions of the wooden disks, here designated $12^x$, substantially as in the construction first described, and the metal disks engage the wooden disks freely enough so that the former may have a certain slippage relative to the latter. To permit this without undue friction, the disks $14^x$ extend inwardly along the inner sides of disk $12^x$ a shorter or less distance than in the construction first described, as will be apparent by comparison of Fig. 3 with Fig. 1, and if necessary, the lateral curving to form the seats or shoulders $14^b$ may be extended laterally outward a somewhat greater distance to provide a firm seating of the metal part of the drum on the wooden disks. This will be apparent also by a comparison of Fig. 3 with Fig. 1.

To permit the predetermined relative movement between the outer and inner portions of the drum, and then to cause the rotation of the outer part to be transmitted to the inner or frictionally retarded part, various constructions may be utilized. For example, in Figs. 3 and 7 the disks $14^x$ are provided with studs $14^y$ which extend into arc shaped slots $12^y$ provided on the inner sides of the wooden disks $12^x$. In the construction illustrated in Figs. 8 and 9 the metal disks $14^x$ are provided with outwardly pressed protuberances $14^z$ which engage in arc shaped notches or recesses $12^z$ formed on the inner sides of the disks $12^x$.

Obviously with either construction during certain minor relative vibrations between the car body and the running gear, the studs $14^y$ or the protuberances $14^z$ of the disks $14^x$ will swing freely in the slots $12^y$ or $12^z$ without imparting movement to the wooden disks $12^x$. On the other hand, when the studs or protuberances reach the ends of the slots $12^y$ or notches $12^z$, the movement of the outer part of the drum is imparted to the wooden disks. In other words, though what may be termed a neutral zone is provided, in the limits of which no movement is imparted to the frictionally resisted portions of the drum, nevertheless when the vibrations or relative movements between the car body and the axle or running gear reach a given amount, then the inner or frictionally retarded portions of the drum as well as the outer portions are retarded and the shock absorber functions as with the construction first described.

While I have shown two ways in which the outer part of the drum may rotate a given amount relative to the wooden portions and then with the latter, other ways of accomplishing this result may be employed if found desirable.

Having described my invention, I claim:

1. In a shock absorber, a rotatable drum, a spring adapted to rotate the drum in one direction, a strap adapted to be wound onto and unwound from the drum, said drum being composed of a pair of non-metallic side members by which the drum is supported and a metallic outer portion with side portions engaging the non-metallic side members.

2. In a shock absorber of the type having a friction retarded rotatable drum and a strap adapted to be wound onto and unwound from the drum, a drum composed of a pair of non-metallic side members which forms the bearing portions of the drum and an outer metal portion having side members engaging the inner sides and periphery of the non-metallic members.

3. A shock absorber comprising a rotatable hollow drum composed of a pair of non-metallic side members by which the drum is supported and a metallic outer portion having a peripheral member and side members engaging the non-metallic side members, a pair of friction members engaging the non-metallic side members, a spring housed in the drum and connected thereto, and a strap adapted to be wound onto and unwound from the drum.

4. In a shock absorber, a drum composed of a pair of non-metallic side members, a pair of metallic outer side members engaging the outer portions only of the first-named and a peripheral portion or band connected to and seated upon the second-named side members, a spring housed within the drum, a strap connected to the drum, and means for frictionally retarding rotation of the drum.

5. In a friction retarded shock absorber, a drum composed of a non-metallic side member and a metallic outer portion, a strap engaging the latter, a spring for rotating the drum in one direction, and a friction plate or disk engaging the side and peripheral portion of the non-metallic member.

6. In a friction retarded shock absorber, a hollow drum composed of a pair of non-metallic side members and a metallic outer portion, a strap engaging the latter, and a pair of friction plates or disks engaging the sides and extending inwardly over portions of the periphery of the non-metallic members.

7. A shock absorber comprising a hollow composite drum composed of two oil impregnated wood side members, a metallic outer portion engaging the inner sides of said side members, a strap connected to said outer portion, a spring housed within the drum, and two stationary friction disks extending along the outer sides and inwardly for a distance over the peripheral portions of said side members.

8. A shock absorber comprising a rotatable drum to which a strap is adapted to be connected, a spring for rotating the drum in one direction, a friction member engaging the drum, and means for forming a temporary lock between the drum and friction member to hold the drum against rotation when the spring is wound up.

9. A shock absorber comprising a rotatable drum having a strap wound thereon, a spring for rotating the drum in one direction, a friction member engaging the drum to frictionally retard its rotation, and a locking device carried by the drum and adapted to engage the friction member to temporarily hold the drum against rotation under the action of the spring when the latter is wound up.

10. In a friction retarded shock absorber, a drum composed of a non-metallic side member and a metallic outer portion, a strap engaging the latter, a spring for rotating the drum in one direction, and a friction plate or disk engaging the peripheral portion of the non-metallic member.

In testimony whereof, I hereunto affix my signature.

JACOB R. SNYDER.